Nov. 4, 1969     J. G. SCHRECKENDGUST     3,476,029
ELECTROCHROMIC SHUTTER SYSTEM

Filed Aug. 16, 1967     3 Sheets-Sheet 1

INVENTOR.
JAY G. SCHRECKENDGUST

HIS ATTORNEY

Nov. 4, 1969  J. G. SCHRECKENDGUST  3,476,029
ELECTROCHROMIC SHUTTER SYSTEM
Filed Aug. 16, 1967  3 Sheets-Sheet 2

INVENTOR.
JAY G. SCHRECKENDGUST
BY Cumpston,
Shaw and Stephens
HIS ATTORNEY

INVENTOR.
JAY G. SCHRECKENDGUST

United States Patent Office 3,476,029
Patented Nov. 4, 1969

3,476,029
ELECTROCHROMIC SHUTTER SYSTEM
Jay G. Schreckendgust, Lima, N.Y., assignor to Graflex, Inc., Pittsford, N.Y., a corporation of New York
Filed Aug. 16, 1967, Ser. No. 661,100
Int. Cl. G03b 7/08
U.S. Cl. 95—53          18 Claims

ABSTRACT OF THE DISCLOSURE

A camera shutter system uses a normally opaque electrochromic cell and a mechanical light blocking device in series across the camera's light path and arranged so that full opening of the light blocking device closes a switch to electrically energize the cell. Such energization opens the cell to light and is maintained for a preselected interval for a photographic exposure. After the energization is stopped, the cell relaxes to its opaque condition, and the mechanical device returns to its light blocking position. The light blocking device can be a variety of movable mechanical structures including a simple mechanical shutter of fixed opening period with the electrochromic cell energized upon full opening of the shutter. The cell and the light blocking device can be arranged in front of the lens, between elements of the lens, behind the lens, or ahead of the focal plane. The cell can be formed with several pairs of electrodes arranged as desired for photographic effects. Multiple electrode arrangements include concentric electrodes for a variable aperture cell and parallel zone electrodes that are variably energized for a focal plane cell.

---

This invention relates to a general purpose electrochromic camera shutter system.

Electrochromic cells are generally known and have been used for goggles and variable density panels. Also, it has been suggested that such cells be used as camera shutters, but for various reasons they have not proved practically effective as suggested.

The objects of this invention include, without limitation, the following:

(a) a fast, versatile, and reliable general purpose camera shutter system that is economically manufactured;

(b) a camera shutter system having relatively few moving parts and minimal vibration in operation; and (c) a shutter system that is economical to maintain, convenient to operate, and portable, compact, and rugged.

These and other objects of the invention will be apparent hereinafter from the specification which describes the invention, its use, operation, and preferred embodiments, from the drawings which constitute a part of the disclosure, and from the subject matter claimed.

In general, the inventive shutter system includes an electrochromic cell and a mechanical light blocking device arranged in series across the light path of a camera. The light blocking device can be a simple mechanical shutter of fixed period, a removable dark slide, a removable member positioned in front of the lens to function as a lens cap, or some other light obstructing device. Full removal of the light blocking device from the light path actuates a switch to energize the cell. The particles in the liquid suspension in the cell rapidly align with the electric field to open the cell for the interval desired for exposure. The cell reverts to a normally closed condition when the timed energization stops, and thereafter, the mechanical device returns to its light blocking position. Thus, the protection afforded by a lens cap or dark slide is combined with the speed, versatility, simplicity, and economy of an electrochromic cell for a decisive advance in the art of photographic shutters.

Throughout the specification and claims the term "electrochromic cell" or more simply "cell" refers to a liquid suspension of oblong particles between substantially transparent plates, the particles being normally randomly oriented making the suspension opaque to light, but the particles being orientable in an electric field to align their major axes with the field for opening the cell to light. Such cells can be made of a liquid suspension of submicroscopic particles of various lengths that act as dipoles aligning with a high frequency electric field passed between the plates. Transparent electrodes are formed on each plate to apply high frequency energization across the liquid suspension. A variety of liquids, particle materials and sizes, plate materials, electrode material and arrangements, frequencies, voltages, etc. are possible for such electrochromic cells. They are so named because of their capacity for changing their optical density in response to an electric field. Another type of electrochromic cell included within the meaning of such term in this application is a liquid suspension of needle-like magnetic bodies normally randomly oriented to make the suspension opaque, but capable of being oriented with an electro-magnetic field to open the cell to light. These and equivalent liquid particle suspension cells capable of changing their optical density in response to an electric field are included within the meaning of the term "electrochromic" throughout this application. Cells such as included within this term are shown in the following U.S. Patents Pierson, No. 1,835,612; Marks, No. 3,257,903.

Electrochromic cells adaptable to the invention are presently marketed under the brand name of Varad by the Marx Polarized Corporation of Whitestone, N.Y.

Various crystals, birefringent materials and Kerr cells have been used for special purpose and high speed photographic shutters, but these have not been satisfactory for general purpose cameras. Kerr cells, polarizers, and crystal structures are expensive, and crystals in particular are limited to relatively small size. Furthermore, such cells require high voltages for energization, and their power supplies are large, heavy, and expensive. Accordingly, at the present time, no portable electrooptic crystal cells or Kerr cells have been available for use as a general purpose photographic shutter.

When electrochromic cells are referred to in the specification and claims as "closed" to light, this means either random orientation of the suspended particles under the influence of Brownian movement, or orientation of the particles transverse to the light transmission axis in response to an applied electric field. Conversely, "open" refers to orientation of the cell particles in an electric field so as to transmit light through the cell as desired for photographic purposes. Such orientation is normally parallel with the axis of the camera lens system, but it could be oblique to such axis for special photographic purposes.

An electrochromic cell and a mechanical light blocking device are arranged in series across the axis of a camera lens system, but either of these elements can be arranged anywhere along the lens axis within the spirit of the invention. Thus, these elements can be placed in front of the lens, between lens elements, behind the lens, or ahead of the focal plane of the camera and the drawings show several alternative arrangements.

Figure 1:
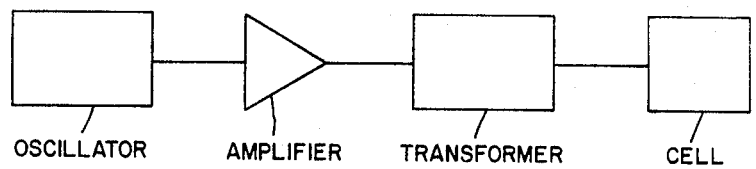
FIG. 1 is a schematic block diagram of a power supply system usable according to the invention for energizing an electrochromic cell.

A variety of generally known electronic power supply systems can be used for energizing an electrochromic cell in the inventive shutter system. FIG. 1 schematically shows an oscillator, amplifier, and transformer arranged for energizing an electrochromic cell. A range of frequencies and voltages can accomplish the required cell energization depending upon the characteristics of the cell selected, and workable voltages are generally lower than required for electrooptic crystal cells or Kerr cells which are generally energized by a high voltage capacitive discharge. Electrochromic cells usable in the inventive system are preferably energized by a short burst of high frequency, moderate voltage energy. The required voltages vary with the thickness of the cells selected and with other factors, and satisfactory operating voltages have fallen between 200 v. and 600 v. RMS. Optimum frequencies vary with the length of dipole particles and other factors, and electrochromic cells have been successfully operated according to the invention at many frequencies between 5 kcs. and 25 kcs.

The power supply schematically illustrated in FIG. 1 is preferably battery powered, formed of solid state miniature components, and arranged to be compact and portable so as to be carried in a conventional photographic camera. The details of such circuitry are not part of this invention and are generally well-known to those skilled in the art.

Figure 2:
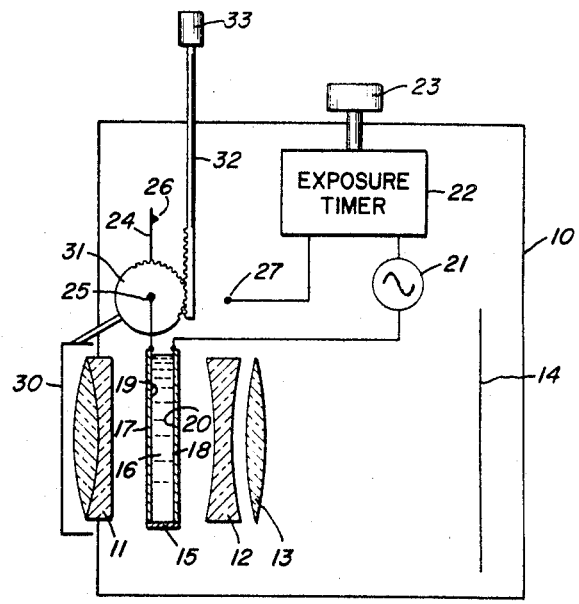
FIG. 2 is a schematic view of an electrochromic cell positioned between the lens elements of a camera, with a mechanical light blocking device arranged in front of the lens according to the invention.
Figure 3:
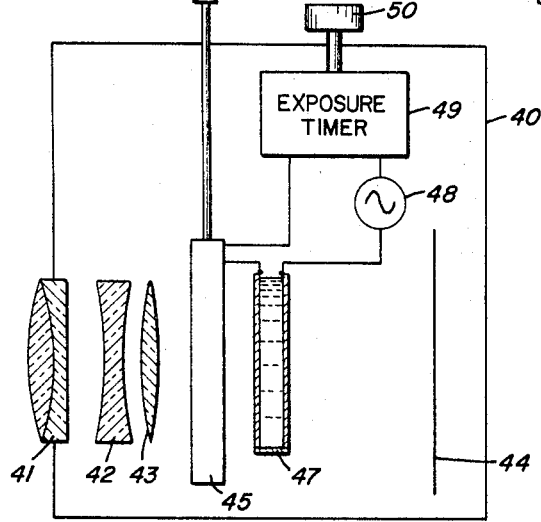
FIG. 3 is a schematic view of an electrochromic cell and a mechanical shutter arranged in series according to the invention behind the lens of a camera.
Figure 4:
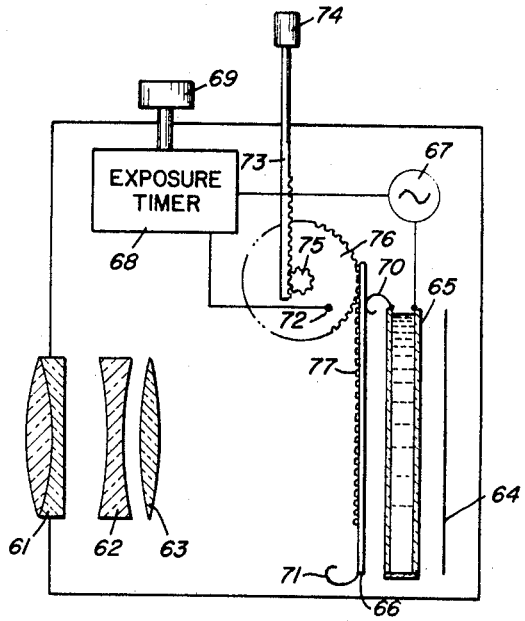
FIG. 4 is a schematic view of an electrochromic cell and a mechanical dark slide arranged according to the invention ahead of the focal plane of a camera.

FIGS. 2-4 show three of the many possible arrangements of electrochromic cells and light blocking mechanisms in the inventive shutter system. In FIG. 2, camera 10 includes lens elements 11, 12, and 13 establishing a light path to film 14 arranged at the focal plane for exposure. An electrochromic cell 15 is disposed between elements 11 and 12 of the camera lens system. Cell 15 contains a liquid 16 in which dipole particles are suspended to form an electrochromic material. Liquid 16 is contained between transparent plates 17 and 18, the inner faces of which bear transparent electrodes 19 and 20 respectively. High frequency energy applied to electrodes 19 and 20 orients particles in liquid 16 parallel with the axis of the camera lens system to open cell 15 to light. When not energized, cell 15 is normally opaque and closed to light with the particles in liquid 16 randomly oriented under the influence of Brownian movement.

Power supply 21 containing the elements illustrated in FIG. 1 energizes cell 15, and exposure timer 22 controls the length of energization to determine the photographic exposure time. Exposure timer 22 is manually adjustable by knob 23 for preselecting the desired exposure time.

Switch arm 24 is pivotal around axis 25 for closing contacts 26 and 27 to complete the energization circuit to cell 15. Upon closure of contacts 26 and 27, energy from power supply 21 is applied to electrodes 19 and 20 to open cell 15 for a predetermined interval.

A light blocking device 30 is arranged ahead of lens element 11 and is mounted for pivoting around axis 25 with switch arm 24. Axis 25 also supports pinion 31 driven by a rack 32 on camera actuating button 33. When button 33 is depressed, rack 32 drives downward to rotate pinion 31 which turns spring arm 24 and lifts light blocking element 30 upward from in front of lens element 11. Light blocking element 30 is arranged to function as a removable lens cap, and when cap 30 is fully lifted from in front of lens element 11, contacts 26 and 27 close the circuit to cell 15 for opening the cell to transmit light to film 14 as described above. The duration of opening of cell 15 is controlled by timer 22 for a desired exposure after which actuator button 33 is released to open contacts 26 and 27 to allow lens cap 30 to return to its illustrated protective position in front of lens element 11.

Camera 40 of FIG. 3 is provided with lens elements 41, 42, and 43 establishing a light path to film 44 arranged at the focal plane for exposure. Behind lens element 43 is arranged a simple mechanical shutter 45 of fixed opening period. Shutter 45 is actuated by camera operating button 46 in a generally known manner.

An electrochromic cell 47 behind shutter 45 is energized by a power supply 48 for an interval determined by exposure timer 49 as adjusted by knob 50. The energization circuit to cell 47 is completed through shutter 45 by full opening of such shutter. For such purpose, a relatively moving part in shutter 45 makes electrical contact to close the circuit to cell 47 upon full opening of shutter 45.

In the operation of camera 40, pushing actuator button 42 downward trips shutter 45 which opens for a preferably fixed and relatively long interval—for example, one tenth of a second. As shutter 45 reaches its fuly opened position the circuit to cell 47 is closed to effect a timed opening of cell 47 for a desired photographic exposure. At the expiration of the energization interval cell 47 reverts to its normally closed condition, and shutter 45 thereafter closes at the end of its set period. Camera 40 is then ready for exposure of another frame of film of 44.

Camera 60 as shown in FIG. 4 is provided with lens elements 61, 62, and 63 establishing a light path to film 64 arranged at the focal plane for exposure. Immediately ahead of film 64 is electrochromic cell 65, and ahead of cell 65 is a removable dark slide 66. A power supply 67 controlled by exposure timer 68 as adjusted by knob 69 controls the energization of cell 65. Dark slide 66 can be moved upward for removal from in front of cell 65, and such removal of dark slide 66 closes the energization circuit to cell 65. This is accomplished by electrical contact 70 engaging dark slide 66 continuously and contact 71 carried by the trailing edge of dark slide 66 engaging contact 72 to complete the energization circuit to cell 65 only when dark slide 66 is fully removed from in front of cell 65.

Removal of dark slide 66 is accomplished by depressing camera actuator button 74 which moves rack 73 downward, this drives gear 75 to rotate gear 76 engaging a rack 77 on dark slide 66 to lift dark slide 66 relatively rapidly from in front of cell 65. At the top of the travel of dark slide 66, contact 71 engages contact 72 to close the energization circuit for cell 65 to produce a timed opening of cell 65 for an exposure of film 64. Upon release of camera actuator button 74 after exposure, dark slide 66 lowers to its illustrated position blocking light to cell 65.

Figure 5:
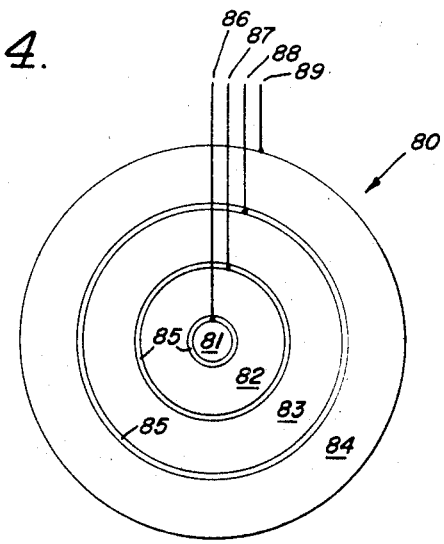
FIG. 5 shows an electrochromic cell having electrodes arranged in correspondingly concentric annular zones for a varaible aperture cell.

FIG. 5 shows an electrochromic cell 80 suitable for between or behind the lens positioning such as shown in FIGS. 2 and 3 respectively. Cell 80 is divided into concentric electrode zones for variable aperture energization. Central zone 81 is formed of coaxial circular electrodes confronting each other on each face plate of cell 80. Annular zone electrodes 82 encircle zones 81 on each plate of cell 80; annular zone electrodes 83 encircle zones 82 on each plate of zone 80, etc. Of course, as many concentric zones can be used as desired within the spirit of the invention.

Zones 81-84 are separated by nonconductive spaces 85 for electrical insulation from one another. Pairs of conductors 86-89 connect to each pair of electrode zones 81–84 respectively for energizing such zones to open the cell liquid between such electrodes. Selective energization through conductors 86–89 accomplishes variable aperture opening of cell 80.

Figure 6:
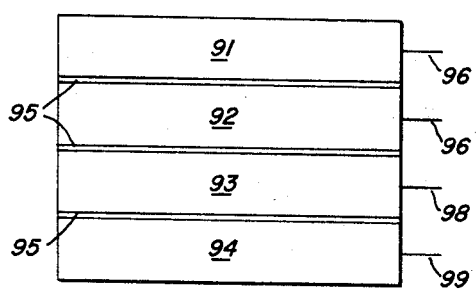
FIG. 6 shows an electrochromic cell having electrodes arranged in generally parallel and linear zones for a focal plane cell.

FIG. 6 shows a four-zone, electrochromic cell 90 suitable for focal plane use in camera 60 as illustrated in FIG. 4. Cell 90 is divided into electrode zones 91–94 extending horizontally and linearly of cell 90 and separated by nonconducting spaces 95 for electrical insulation. As with cell 80, zones on cell 90 are formed by electrodes arranged in respective confronting pairs on each plate of cell 90. Also, any desired number of zones can be used. Pairs of conductors 96–99 connect to each pair of electrode zones 91–94 for energizing such zones successively to provide a cell-opening sweep across cell 90 for a photographic exposure. The period of energization of each zone of cell 90 can be varied as desired to control the exposure of areas on a film.

Figure 7:
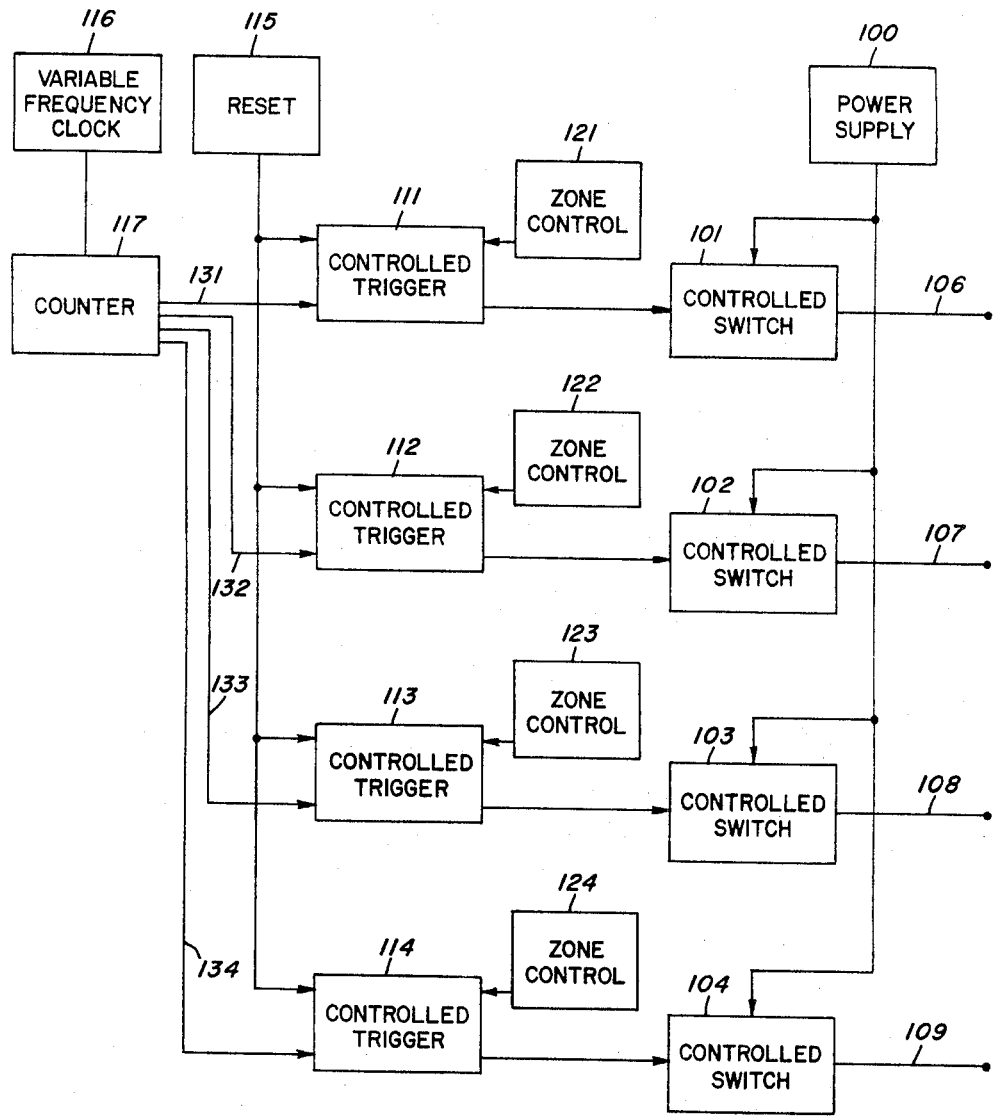
FIG. 7 is a schematic block diagram of a control means for energizing multi-zoned electrochromic cells according to the invention.

FIG. 7 shows a power control device for energizing multizoned cells such as cell 80 or cell 90. Power supply 100 is connected through control switches 101–104 to provide cell zone energization outputs through conductors 106–109 respectively. Switches 101–104 are controlled respectively by triggers 111–114 preferably operating at lower power levels. Switches 101–104 are open whenever an output pulse is present from a respective control trigger 111–114.

The input to triggers 111–114 includes a reset input from reset 115 and pulses input respectively through lines 131–134 from counter 117 which is supplied by pulses from variable frequency clock 116. Also, the output intervals of triggers 111–114 is controlled by manually setable zone controllers 121–124 which can be independently or collectively adjusted. A pulse received from counter 117 by any trigger 111–114 in reset condition, produces an output to its respective switch 101–104 for an interval preselected respectively by controllers 121–124. Resetting of triggers 111–114 enables them to produce another output upon receipt of another pulse from counter 117.

To operate the zones of cell 90 with the power control system of FIG. 7, conductors 106–109 are connected respectively with conductor pairs 96–99 of cell 90. Of course, any additional or lesser number of zones and corresponding control components can be used according to the invention. With such an arrangement, triggers 111–114 are reset and an exposure is initiated by starting variable frequency clock 116. Counter 117 is set for decade operation, and the first pulse from clock 116 produces an output in line 131 from counter 117 to trigger 111 which opens controlled switch 101 for an interval predetermined by zone control 121. This sends energy through line 106 to lines 96 of cell 90 to energize and open zone 91 for exposure. When the interval preselected by controller 121 expires, trigger 111 turns off, switch 101 closes, and zone 91 is de-energized to revert to normal opaqueness. The second pulse from clock 116 produces an output in lines 131 and 132 from decade counter 117 but since trigger 111 has been fired and not reset, the output in line 131 has no effect. The output in line 132 trips trigger 112 for an output measured by controller 122 to open switch 102. This sends power through line 107 to lines 97 of cell 90 to open zone 92. The third pulse from counter 116 produces ineffective pulses in lines 131 and 132 and a pulse in line 133 effective to trip trigger 113 to open switch 103 sending power through line 108 to lines 98 for opening zone 93 of cell 90.

Finally, a fourth pulse from clock 116 produces an effective pulse in lines 134 from counter 117 to trip trigger 114 for opening switch 104 to energize zone 94 of cell 90.

For the above described operation counter 117 can also be set for ring operation to produce a single pulse successively in the lines 131–134 for each incoming pulse from clock 116.

After the exposure is completed by subsequent energization of zones 91–94, clock 116 is turned off, counter 117 is reset to receive a first pulse, and resetting of triggers 111–114 is accomplished by reset mechanism 115. The control system is then in condition for a subsequent exposure.

Thus, it can be seen that each of the zones 91–94 of cell 90 are successively energized and de-energized in an exposure sweep across cell 90. The speed of such sweep is controlled by the frequency of pulses from clock 116—higher frequencies producing a faster sweep. The duration of the exposure of each zone is controlled by manual setting of respective zone controllers 121–124. By this, each of the zones 91–94 can be variably exposed as desired. For example, an overly bright sky can be relatively under exposed by proper setting of the proper zone controller, or a shady spot or a dark foreground can be relatively over-exposed to achieve the desired photographic purpose.

The power control system of FIG. 7 is also usable with variable aperture cell 80 and for such purpose, conductors 106–109 are connected respectively with conductor pairs 86–89 of cell 80.

Variable aperture cell 80 can be operated in two different ways by the power supply system of FIG. 7. In one mode of operation, the exposure duration is controlled by the total number of output pulses from variable frequency clock 116 and the aperture size is controlled by zone controllers 121–124. By manual adjustment from outside the camera, zone control 121 is set to enable trigger 111, and zone controllers 122–124 are set to enable their respective triggers 112–114 for the aperture size desired. For example, if it is not desired to open zones 83 and 84, then controllers 123 and 124 are set to disable triggers 113 and 114. Also, with such an arrangement, the output interval of the triggers is set for a slightly shorter interval than the period of variable frequency clock 116, a continuous reset is applied to the trigger by reset 115, and counter 117 is set for decade operation.

Then, as pulses from clock 116 are applied to triggers 111–114 from decade counter 117, the enabled triggers are opened with each pulse from the counter, and the exposure end when the pulses cease.

Another way the variable cell 80 can be powered by the power control system of FIG. 7 is for zone controllers 121–124 to be set not only for enabling or disabling respective triggers 111–114, but for zone controllers 121–124 to set the exposure interval into each trigger as manually adjusted from outside the camera. Of course, such an adjustment can be collective. With such an arrangement, clock 116 does not measure the exposure interval, triggers 111–114 are not reset until after the exposure is completed, and counter 117 is operated in either the decade or ring mode.

In such operation, a first pulse from clock 16 produces an output in line 131 from counter 117 to trip enabled trigger 111 for an interval set by controller 121 to open switch 101 for the desired interval. This sends power through line 106 to lines 86 of cell 80 to open zone 81 for the predetermined interval. If a larger aperture is desired, trigger 112 is enabled by zone controller 122, and the second pulse from counter 117 produces a pulse in line 132 effective to trip trigger 112 for opening switch 102. This sends power through line 107 to lines 87 of cell 80 to open zone 82 for the interval preselected by controller 112. The opening of outer zones of cell 80 proceeds as described for inner zones 81 and 82 on subsequent pulses from clock 116 and counter 117 providing that triggers 113 and 114 are enabled by the camera operator for a wider aperture.

Many other electrode zone arrangements for electrochromic cells are possible within the spirit of the invention, and such zones can be energized simultaneously or in any sequence desired. Since the electrochromic cell in the inventive system is electronically controlled, a great variety of speeds, timing arrangement, adjustments, etc. are possible within the spirit of the invention.

Thus it will be seen that the inventive shutter system accomplishes its objects in providing an economical, simple, and reliable shutter system having few moving parts and minimal vibration. The inventive system is also compact, portable, fast, and photographically versatile. It combines the speed, efficiency, and variability with security, reliability and ruggedness. It provides a focal plane shutter of exceptionally high speed and with variable zone exposure to achieve many advantages of focal plane shutters without the disadvantages of slow speed and difficulty of control. It also offers the protection of a lens cap or dark slide without requiring inconvenient or extra motions by the camera operator or risking operator error as to removal of such items.

While the invention has been disclosed herein by reference to the details of preferred embodiments, it is to be understood that such disclosure is intended in an illustrative rather than a limiting sense, and it is contemplated that various modifications of the construction and arrangement of the parts will readily occur to those skilled in the art within the spirit of the invention and the scope of the appended claims.

I claim:
1. A shutter system for a camera having a lens system providing a light path, said shutter system comprising:
 (a) an electrochromic cell arranged across said light path, said cell being normally closed to light;
 (b) electric means for energizing said cell to open said cell to light;
 (c) electric switch means for actuating said energizing means to open said cell;
 (d) movable light blocking means normally arranged across said light path;
 (e) means for moving said light blocking means from said light path; and
 (f) means for actuating said switch means upon removal of said light blocking means from said light path.

2. The system of claim 1 wherein said light blocking means comprises a mechanical shutter of fixed period.

3. The system of claim 2 wherein said actuating means is arranged for actuating said mechanical shutter.

4. The system of claim 1 wherein said electric energization means includes means for varying the interval of said energization.

5. The system of claim 1 wherein said cell is arranged between elements of said lens system.

6. The system of claim 1 wherein said cell is arranged behind said lens system.

7. The system of claim 1 wherein said cell is arranged in the region of the focal plane of said lens system.

8. The system of claim 1 wherein said light blocking means is arranged adjacent said cell.

9. The system of claim 1 wherein said light blocking means is arranged in front of said lens system.

10. The system of claim 1 wherein said light blocking means is arranged between elements of said lens system.

11. The system of claim 1 wherein said light blocking means is arranged behind said lens system.

12. The system of claim 1 wherein said light blocking means is arranged in the region of the focal plane of said lens system.

13. The system of claim 1 wherein said cell is formed with a plurality of pairs of electrodes, and wherein said energizing means is arranged for preselected energization of said pairs of electrodes.

14. The system of claim 13 wherein said pairs of electrodes are arranged in correspondingly concentric annular zones on opposite sides of said cell.

15. The system of claim 13 wherein said pairs of electrodes are arranged in generally parallel and linear zones on opposite sides of said cell.

16. The system of claim 15 wherein said energizing means is arranged for energizing said pairs of electrodes in succession.

17. The system of claim 13 wherein said energizing means comprises a power supply, pulse generating means, trigger means responsive to said pulse generating means, and switch means actuated by said trigger means for connecting said preselected pairs of electrodes to said power supply.

18. The system of claim 17 includes means for adjusting said trigger means to determine the interval of said energization.

References Cited
UNITED STATES PATENTS

| | | | |
|---|---|---|---|
| 3,270,638 | 9/1966 | Anwyl | 350—160 |
| 3,322,482 | 5/1967 | Harmon | 350—267 |
| 3,342,539 | 9/1967 | Nelson | 350—160 |
| 3,402,001 | 9/1968 | Fleisher | 350—160 |

NORTON ANSHER, Primary Examiner

L. H. McCORMICK, Jr., Assistant Examiner

U.S. Cl. X.R.

250—209; 350—160, 267